Nov. 17, 1953
F. B. HALFORD ET AL
2,659,197
CONTROL SYSTEM FOR ROCKET MOTORS
Filed Dec. 27, 1949
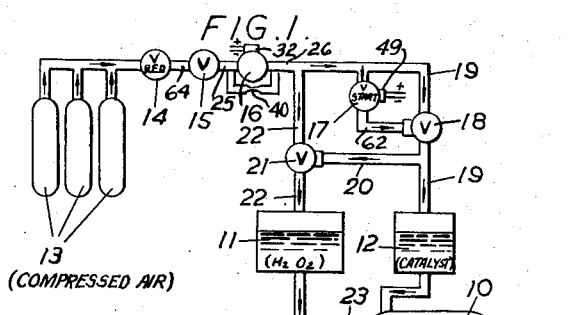
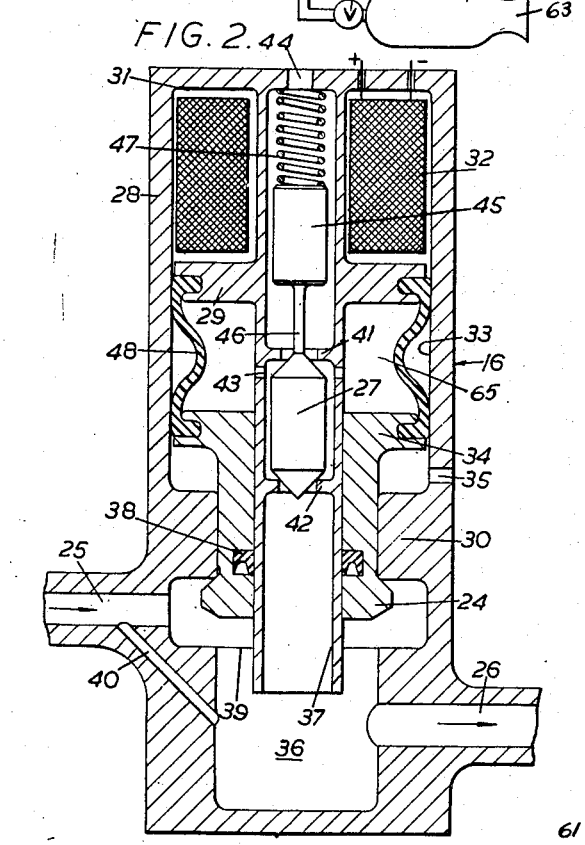
Inventor
Frank B. Halford
Arthur V. Cleaver
Ernest B. Dore
By
Emery, Holcombe & Blair
Attorneys Patented Nov. 17, 1953

2,659,197

UNITED STATES PATENT OFFICE 2,659,197

CONTROL SYSTEM FOR ROCKET MOTORS

Frank Bernard Halford, Edgware, Arthur Valentine Cleaver, London, and Ernest Baker Dove, East Barnet, England, assignors to The De Havilland Engine Company Limited, Stonegrove, Edgware, England, a company of Great Britain Application December 27, 1949, Serial No. 135,284

Claims priority, application Great Britain January 3, 1949

5 Claims. (Cl. 60—35.6)

This invention relates to rocket type propulsion apparatus of the kind in which propellent liquid or liquids are injected into a reaction chamber in which a reaction takes place accompanied by the evolution of gases which issue from a nozzle with propulsive effect.

It is an object of the present invention to provide control means for such rocket propulsion apparatus which will enable an operator to make certain that the apparatus is in operating condition before bringing it into full operation.

According to the present invention a rocket type propulsion apparatus of the kind specified includes a starting control which when actuated causes the propellent liquid or liquids to be injected into the reaction chamber, and a thrust selector which if set in a full thrust position when the starting control is actuated allows the propellent liquid or liquids to enter the reaction chamber at the rate for full thrust, but if set in a check thrust position only allows the propellent liquid or liquids to enter the reaction chamber at a much reduced rate, hereinafter termed the checking rate.

The invention is more particularly, although not exclusively, applicable to rocket type propulsion apparatus of the kind in which compressed air or gas admitted to the propellent liquid reservoir or reservoirs forces the propellent liquid or liquids into the reaction chamber. In such an apparatus the rate of flow of a propellent liquid into the reaction chamber depends largely on the pressure of the compressed air or gas which is applied to it, and in one form of the invention the thrust selector controls a valve, hereinafter termed the check thrust valve, in the compressed air or gas supply to the reservoir or reservoirs, this valve affording a large aperture when the thrust selector is in the full thrust position and a considerably smaller aperture when the thrust selector is in the check thrust position. Thus when the selector control is in the latter position there is a considerable pressure drop at the check thrust valve, so that the pressure applied to the liquids in the reservoirs is considerably reduced, and when the starting control is actuated the liquids will only enter the reaction chamber at the checking rate.

The check thrust valve may be actuated by the compressed air or gas which is admitted to one or other of a pair of opposed actuating surfaces of a movable valve member in dependence on the position of a pilot valve, which will in turn depend on the setting of the thrust selector. The pilot valve may conveniently be moved against the action of a spring by a solenoid which is energised when a switch constituting the thrust selector is closed, the spring returning the pilot valve to its original position when the thrust selector switch is opened.

In cases where the starting control opens a starting valve in the compressed air supply electrically by means of a solenoid, the two solenoids may be so connected with the starting control switch and the thrust selector switch that when the latter is set in the check thrust position and the starting control switch is actuated both solenoids will be energised. On the other hand when the thrust selector switch is set in the full thrust position and the starting control switch is actuated only the starting valve solenoid will be energised. The electrical circuit may be arranged in various ways to achieve this end. Safety devices are preferably incorporated for warning the operator, in the event of a failure in the circuit.

There will generally be some form of non-return valve between a propellent liquid reservoir and the reaction chamber. This may take the form of an injector valve for the admission of a propellent liquid, and this valve may be so arranged that when the pressure of the propellent liquid is low, i. e. when the thrust selector is set in the checking position, it will only permit a flow of propellent liquid into the reaction chamber at the checking rate. This may be achieved by suitable adjustment of the injector valve spring. Preferably a valve having main flow and auxiliary flow passages is employed. A valve of this kind is described in the present applicants' United States patent specification Serial No. 135,283, filed December 27, 1949.

The invention may be carried into effect in various ways but one particular arrangement will be described by way of example with reference to the accompanying drawings, as applied to a rocket unit intended for installation in or attachment to an aircraft for assisting its take off. In the drawing:

Figure 1 is a diagram of the general arrangement of the rocket unit,

Figure 2 is a diagrammatic cross section of one form of check thrust valve, and

Figures 3 and 4 are circuit diagrams showing alternative arrangement of the control circuit.

The general arrangement and form of the rocket unit is described in United States patent specification Serial No. 135,282, filed December 27, 1949, in the names of Frank Bernard Halford and Arthur Valentine Cleaver, now Patent No. 2,634,577. Broadly speaking, and as indicated in Figure 1, it consists of a reaction chamber 10 having a reaction nozzle 63, into which chamber can be injected a main propellant, for instance hydrogen peroxide, from a reservoir 11, and a secondary propellant, for instance sodium or calcium permanganate which acts as a dissociation catalyst for hydrogen peroxide, from a reservoir 12. The liquids are injected by compressed gas, for instance air, which is stored in bottles 13.

The compressed air passes first through an automatic pressure reducing valve 14 of conventional construction and then through pipe 64 to a manually actuated on-off or air release valve 15 (described in Patent No. 2,612,019, dated September 30, 1952). When the air release valve is open compressed air flows through it into pipe 25 and thence to the check thrust valve 16, which will be described in detail below. After leaving the check thrust valve 16 the compressed air passes through pipe 26 to a solenoid operated starting valve 17. When this starting valve is opened by actuation of a starting switch compressed air passes through it into pipe 62 and opens a pressure-actuated catalyst air distributor valve 18, which allows compressed air to flow through a pipe 19 and enter the catalyst reservoir 12 and so inject the catalyst into the reaction chamber 10. A portion of the compressed air which has passed through the catalyst air distributor valve 18 flows along a pipe 20 and opens a pressure-actuated hydrogen peroxide air distributor valve 21, thus allowing compressed air to flow through a pipe 22 and enter the hydrogen peroxide reservoir 11, and so inject hydrogen peroxide into the reaction chamber 10 through an automatic injector valve 23. The hydrogen peroxide thereupon dissociates, producing propellant gases which are expelled through nozzle 63 at high velocity.

The check thrust valve 16, as shown in Figure 2, consists of two distinct valve members, namely a main valve member 24 which, when opened, allows compressed air to pass freely from the air release valve 15 through an inlet passage 25 to the starting valve 17 through an outlet passage 26, and a pilot valve 27 which controls the movements of the main valve member 24.

The valve housing 28 is divided by transverse partitions 29 and 30 into three chambers, of which the upper chamber 31 accommodates a solenoid 32 for actuating the pilot valve 27. The centre chamber 33 constitutes a cylinder in which can move a piston 34 connected to the main valve member 24, the space below this piston being always vented to the atmosphere through a port 35. The third or lower chamber 36 constitutes a compressed air chamber. The space 65 above the piston 34 is sealed from the center chamber 33 by a bellows 48 connected at its upper end to the partition 29 and at its lower end to the piston 34.

A tubular element 37 which accommodates the pilot valve 27 extends through the chamber 31 and the space 65 and opens into the third chamber 36. The main valve member 24 and the piston 34 can slide freely upon the tubular element 37, but a fluid seal 38 is provided to prevent leakage of air along the sliding surfaces.

There is an annular shoulder 39 in the lower chamber 36 which constitutes a seating for the main valve member 24. The compressed air inlet passage 25 enters the chamber 36 above this seating and the compressed air outlet passage 26 leaves the chamber 36 below the seating. There is a small bypass passage 40 through which air can pass with a substantial pressure drop from the inlet passage 25 to the outlet passage 26 when the main valve member 24 is closed upon its seating 39.

The pilot valve 27 which, as stated above, is accommodated in the tubular element 37, consists of a double ended needle valve which can move between two stationary seats 41 and 42 formed in transverse partitions in the tubular element 37 so as to close one or the other. The space between these seats, in which lies the pilot valve 27, communicates through passages 43 in the wall of the tubular element 37 with the space 65 above the piston 34. The interior of the tubular element below the lower pilot valve seat 42 communicates with the lower chamber 36, while the part of the tubular element 37 above the upper pilot valve seat 41 communicates with the atmosphere through a port 44 and accommodates the solenoid armature 45, which is attached by a stem 46 to the pilot valve 27. A light spring 47 bears against this armature and urges the pilot valve 27 towards its lower seat 42. When the solenoid is energised the armature 45 is forced upwards, compressing this spring and raising the pilot valve 27 until it bears against its upper seat 41.

When the pilot valve is in its lower position the space 65 is in communication with the atmosphere, and the pressure of the compressed air on the underside of the main valve member 24 raises it from its seating so that the compressed air can flow without hindrance from the inlet passage 25 to the outlet passage 26. On the other hand, when the solenoid is energised and the pilot valve 27 is raised into its upper position, compressed air enters the space 65 and so pushes the piston 34 downwards and forces the main valve member 24 on to its seating. Compressed air can now only pass from the inlet passage 25 to the outlet passage 26 through the restricted passage 40, so that it reaches the outlet passage 26, and hence eventually the reservoirs 11 and 12, at a considerably reduced pressure. Thus when the solenoid 32 is energised the propellent liquids will enter the reaction chamber at the checking rate.

Referring now to Figure 3, the solenoid 49 of the starting valve 17 and the solenoid 32 of the check thrust valve 16 are interconnected with a starting control switch 50 and a thrust selector switch indicated generally at 51. The thrust selector switch 51 has three positions, an "off" position 52, a "check" position 53, and a "fire" or full operation position 54. The movable member of the thrust selector switch is connected at all times to one terminal of a source of current 55, while the other terminal of the source of current is connected through the starting control switch 50 to one end of both the solenoids 32 and 49. When the thrust selector switch is in the "check" position 53 the movable member connects the other ends of the solenoids 32 and 49 to the source of current 55, so that as soon as the starting control switch 50 is closed a current will flow in parallel through both the solenoids 32 and 49. When the thrust selector switch 51 is set in the "fire" position 54, the circuit through the solenoid 32 of the check thrust valve remains open, so that when the starting control switch 50 is closed only the starting valve solenoid 49 will be energised.

When the thrust selector switch 51 is in the "off" position 52, the circuits through both solenoids are open so that neither solenoid will be energised even though the starting control switch 50 should inadvertently be closed.

In an alternative circuit shown in Figure 4 the solenoids 32 and 49 are connected in series. In this arrangement the thrust selector switch 56 is arranged so that when in the "off" position 57 no current will flow through either solenoid. When in the "check" position 58 a current will flow in series through both the solenoids 32 and 49, and while in the "fire" position 59 a current will flow only through the solenoid 49 when the starting control switch 50 is closed.

Indicating lamps 60 and 61 or other safety devices are provided in the circuits of Figure 3 and Figure 4 so that the operator can be sure that the starting solenoid 49 will be energised and the check thrust solenoid 32 will be deenergised whenever full thrust is required.

It will be appreciated that many modifications may be made to the arrangements described. For instance electrical operation of the check thrust valve is not essential, since mechanical, hydraulic or pneumatic means can be provided for actuating the pilot valve 27 in the arrangement described above.

What we claim as our invention and desire to secure by Letters Patent is:

1. Rocket propulsion apparatus comprising at least one reservoir for propellent liquid, a storage container for a gaseous pressure medium, a reaction chamber, a propulsion nozzle extending rearwardly from said reaction chamber, a pressure medium conduit from said storage container to said reservoir, a propellent conduit from said reservoir to said reaction chamber, a starting control valve in said pressure medium conduit for initiating the propellent injection, a thrust selector, a check thrust valve in said pressure medium conduit upstream of said starting control valve, said check thrust valve having a main valve member and a large aperture and a throttling aperture which apertures are selectively controlled by said main valve member, and actuating means for said main valve member responsive to the setting of the thrust selector adapted when the thrust selector is set in one position to hold said main valve member in one end position with the large aperture open and, when the thrust selector is set in another position, to hold said main valve member in its other end position in which said large aperture is closed and only the throttling aperture is open.

2. Rocket propulsion apparatus as claimed in claim 1, in which the check thrust valve includes a pressure sensitive actuating device for said main valve member adapted when subjected to super-atmospheric pressure to hold said main valve member in its end position in which said large aperture is closed, passage means communicating with said actuating device, a pilot valve in said passage means adapted in one position to open said passage means only to the gaseous pressure medium and in another position to open said passage means only to the atmosphere, and an operative connection between said thrust selector and said pilot valve for determining the position of said pilot valve in accordance with the setting of the thrust selector.

3. Rocket propulsion apparatus as claimed in claim 1, in which the check thrust valve includes a pilot valve, a spring urging said pilot valve towards one end position, and a solenoid which is adapted when energised to move said pilot valve towards an opposite end position in opposition to said spring, the thrust selector comprises a circuit-controlling switch adapted when in one setting to energise said solenoid and when in another setting to de-energise said solenoid, and the movable valve member includes a pair of opposed actuating surfaces adapted to be selectively exposed to the gaseous pressure medium in dependence on the position of the pilot valve whereby when the pilot valve is in one position one of said opposed surfaces is exposed to the gaseous pressure medium and the main valve member is urged into one end position whereas when the pilot valve is in another position the other of said opposed surfaces is exposed to the gaseous pressure medium and the main valve member is urged into its other end position.

4. Rocket propulsion apparatus comprising at least one reservoir for propellent liquid, a reaction chamber, a propulsion nozzle extending rearwardly from said reaction chamber, means for injecting propellent liquid from said reservoir into said reaction chamber for gas-producing reaction therein, a solenoid-operated starting valve for initiating the propellent injection, a solenoid-operated check thrust valve, a starting switch, a thrust selector switch, an electric current supply, and an electric circuit connecting said solenoids, said switches, and the said supply, and adapted so that when the thrust selector switch is in one position and the starting switch is closed both solenoids are connected to the electric current supply, but when the thrust selector switch is in another position and the starting switch is closed only the starting valve solenoid is connected to the electric current supply.

5. Rocket propulsion apparatus as claimed in claim 4, in which the thrust selector switch is arranged so that when set in a third position both solenoids are disconnected from the electric current supply.

FRANK BERNARD HALFORD.
ARTHUR VALENTINE CLEAVER.
ERNEST BAKER DOVE.

References Cited in the file of this patent

UNITED STATES PATENTS

| Number | Name | Date |
|---|---|---|
| 670,563 | Morris | Mar. 26, 1901 |
| 1,194,965 | Darrow | Aug. 15, 1916 |
| 1,925,301 | Campbell | Sept. 5, 1933 |
| 2,139,064 | Beattie | Dec. 6, 1938 |
| 2,192,042 | Hoffmann | Feb. 27, 1940 |
| 2,397,659 | Goddard | Apr. 2, 1946 |
| 2,470,564 | Lawrence | May 17, 1949 |
| 2,479,888 | Wyld | Aug. 23, 1949 |
| 2,496,553 | Littlefield | Feb. 7, 1950 |

OTHER REFERENCES

Journal of the American Rocket Society; No. 72; December 1947; pages 28, 29, 47 and 48.